United States Patent
Glade et al.

(10) Patent No.: US 11,815,167 B2
(45) Date of Patent: Nov. 14, 2023

(54) LUBRICANT GUIDE SHELL FOR AN ARRANGEMENT IN THE AREA OF A HYDRODYNAMIC TORQUE CONVERTER

(71) Applicant: ZF Friedrichshafen AG, Friedrichshafen (DE)

(72) Inventors: Gabriele Glade, Friedrichshafen (DE); Thomas Riedisser, Sigmarszell (DE); Leschek Debernitz, Eriskirch (DE); Stephan Stroph, Tettnang (DE); Peter Reinders, Markdorf (DE); Wolfgang Schmid, Tettnang (DE); Frank Pfarrherr, Donaueschingen (DE); Florian Lanz, Tettnang (DE); Rudolf Raedler, Meckenbeuren (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/829,886

(22) Filed: Jun. 1, 2022

(65) Prior Publication Data
US 2022/0389995 A1    Dec. 8, 2022

(30) Foreign Application Priority Data

Jun. 2, 2021    (DE) .......................... 102021205624.5

(51) Int. Cl.
*F16H 41/30*    (2006.01)
*F16H 45/02*    (2006.01)
(Continued)

(52) U.S. Cl.
CPC .............. *F16H 41/30* (2013.01); *F16H 45/02* (2013.01); *B60K 2006/4825* (2013.01); *F16H 57/0423* (2013.01)

(58) Field of Classification Search
CPC ...... F16H 2045/002–0294; F16H 41/30; F16H 57/029; F16H 57/0454; B60K 6/48; B60K 2006/4825; F16D 2300/26
See application file for complete search history.

(56) References Cited

U.S. PATENT DOCUMENTS 4,903,798 A * 2/1990 Takemoto ........... F16H 57/0421
184/6.12
5,152,190 A * 10/1992 Jurgens ................... F16H 41/30
475/59

(Continued)

FOREIGN PATENT DOCUMENTS

| DE | 102010014821 A1 | 12/2010 |
|---|---|---|
| DE | 102014118485 A1 | 6/2015 |

(Continued)

OTHER PUBLICATIONS

German Search Report DE 10 2021 205 624.5, dated Jan. 12, 2022. (12 pages).

*Primary Examiner* — Ernesto A Suarez
*Assistant Examiner* — James J Taylor, II
(74) *Attorney, Agent, or Firm* — Dority & Manning, P.A.

(57) ABSTRACT

A lubricant guide shell (32) for includes a first, radially extending section (33), which is provided for being situated axially opposite an end face (35) of a torque converter (9) in an installed state of the lubricant guide shell (32). The first section (33) transitions radially outwardly into a second, axially extending section (34), which, in the installed state of the lubricant guide shell (32), is configured for axially at least partially and radially outwardly encompassing the torque converter starting from the first section (33). The first section (33) as well as the second section (34) are configured to be completely circumferential.

15 Claims, 6 Drawing Sheets

(51) Int. Cl.
  *B60K 6/48*  (2007.10)
  *F16H 57/04*  (2010.01)

(56) References Cited

U.S. PATENT DOCUMENTS

| | | | |
|---|---|---|---|
| 6,184,603 | B1 | 2/2001 | Hamai et al. |
| 6,408,718 | B1 * | 6/2002 | Nogle .................. F16H 57/029 74/606 R |
| 7,461,720 | B2 * | 12/2008 | Min ..................... F16H 57/027 184/6.12 |
| 8,113,089 | B2 | 2/2012 | Maguire |
| 9,086,126 | B2 * | 7/2015 | Frait ....................... B60K 6/26 |
| 9,878,706 | B2 | 1/2018 | Frait et al. |
| 10,385,960 | B2 * | 8/2019 | Zhang ................ F16H 57/0453 |
| 2021/0053433 | A1 | 2/2021 | Gyarmati et al. |

FOREIGN PATENT DOCUMENTS

| | | |
|---|---|---|
| DE | 102017123610 A1 * | 4/2019 |
| DE | 102019212670 A1 | 2/2021 |
| JP | 2020172977 A * | 10/2020 |

\* cited by examiner

LUBRICANT GUIDE SHELL FOR AN ARRANGEMENT IN THE AREA OF A HYDRODYNAMIC TORQUE CONVERTER

CROSS-REFERENCE TO RELATED APPLICATION

The present application is related and had right of priority to German Patent Application No. 102021205624.5 filed in the German Patent Office on Jun. 2, 2021, which is incorporated by reference in its entirety for all purposes.

FIELD OF THE INVENTION

The invention relates generally to a lubricant guide shell for an arrangement in the area of a hydrodynamic torque converter. Moreover, the invention relates generally to a hybrid drive unit including an electric machine, a torque converter coupled to the electric machine, and including the aforementioned lubricant guide shell.

BACKGROUND

Automatic transmissions for motor vehicles are frequently equipped with starting units in the form of hydrodynamic torque converters. A hydrodynamic torque converter is usually connected upstream from a gear set of the transmission on the input side. During operation, a state is to be avoided, in which larger quantities of lubricant accumulate in the area of the torque converter, since this can result in a foaming of the lubricant due to the rotating components of the torque converter, which can result in an increase of a temperature of the lubricant, drag losses, and also a delivery of the lubricant into unintended areas. For this reason, in the case of a transmission including a hydrodynamic torque converter, a guide shell is occasionally provided in the area of the hydrodynamic torque converter, which is to prevent an excessive accumulation of lubricant in the area of the hydrodynamic torque converter.

DE 10 2019 212 670 A1 describes a hybrid drive unit for a motor vehicle, wherein the hybrid drive unit, as a module, includes an electric machine and a hydrodynamic torque converter. The module is provided for the arrangement at a motor vehicle transmission, wherein the hydrodynamic torque converter is then located on the input side of a gear set of the motor vehicle transmission. In order to prevent larger quantities of lubricant from accumulating in the area of the torque converter in the case of a downhill position or as a result of a strong braking procedure, which could result in a foaming of the lubricant, a lubricant guide shell is provided between the torque converter and the gear set. This lubricant guide shell is designed as a half-shell and includes a first section, which extends essentially radially and is utilized for axially shielding a lower half of the torque converter with respect to the gear set. The first section is then followed radially outwardly by a second section of the lubricant guide shell, which extends largely axially and radially encompasses the lower half of the torque converter. Overall, the lubricant guide shell has an L-shaped cross-section.

SUMMARY OF THE INVENTION

Example aspects of the present invention provide a lubricant guide shell, via which, upon application in the area of the hydrodynamic torque converter, an excessive accumulation of lubricant in the area of the hydrodynamic torque converter can be reliably prevented.

According to example aspects of the invention, a lubricant guide shell, which is provided for an arrangement in the area of a hydrodynamic torque converter, includes a first, radially extending section, which is provided for being situated axially opposite an end face of the torque converter in an installed state of the lubricant guide shell. In addition, the first section transitions radially outwardly into a second, axially extending section, which, in the installed state of the lubricant guide shell, is designed for axially at least partially and radially outwardly encompassing the torque converter starting from the first section.

Within the meaning of the invention, "axial" means an orientation in the direction of a central axis of the lubricant guide shell, wherein this central axis is preferably an axis of symmetry of the guide shell. "Radial" means an orientation in the direction of the diameter of a particular component.

The lubricant guide shell according to example aspects of the invention is preferably provided for a coaxial arrangement in the area of the hydrodynamic torque converter, i.e., in the installed state, the lubricant guide shell is mounted, in particular, coaxially to an axis of rotation of the hydrodynamic torque converter. As a result, the central axis of the lubricant guide shell is then located congruently to the axis of rotation of the torque converter.

Example aspects of the invention now encompasses the technical teaching that the first section as well as the second section are designed to be completely circumferential. In other words, both the first section and the second section extend in the circumferential direction over the entire circumference.

This type of example embodiment of a lubricant guide shell has the advantage that a lubricant guide shell is therefore achieved, which, when arranged on an end face of a hydrodynamic torque converter, reliably ensures that the hydrodynamic torque converter is shielded toward this axial side. This is the case because lubricant is prevented from flowing into the area of the hydrodynamic torque converter from the axial side by the two sections of the guide shell, since the lubricant guide shell therefore largely encompassing the torque converter shields the torque converter toward this axial side. This is ensured even for the case in which a large quantity of lubricant sloshes in the direction of the torque converter due to a strong downhill position of the associated vehicle or also due to a strong deceleration, for example, due to a strong braking maneuver. Overall, due to the shielding, it can always be ensured that a considerable accumulation of lubricant in the area of the hydrodynamic torque converter will not occur, which, due to the turning motion of the torque converter, could otherwise result in a foaming of the lubricant and, thus, also a temperature increase, drag losses, and a delivery of the lubricant into unintended areas.

The lubricant guide shell from DE 10 2019 212 670 A1 is designed as a half-shell, however, as the result of which only a shielding of a vertically downward situated half of the torque converter is possible. If a strong inflow of lubricant into the area of the torque converter takes place, however, for example, due to a strong downhill position of the associated vehicle or also due to a strong acceleration caused by a braking maneuver, lubricant may slosh over the half-shell into the area of the torque converter.

The first section of the guide shell has a disk-shaped configuration due to an extension of the first section in the radial direction and the complete circumference, while the second section is modeled on a hollow cylinder due to an extension of the second section in the axial direction and the complete circumference. Together, the two give the guide shell an essentially U-shaped cross-section, wherein, overall, the lubricant guide shell has, in particular, a cup-shaped or trough-shaped configuration. It is particularly preferred when the lubricant guide shell is configured essentially rotationally symmetrically, wherein the central axis of the lubricant guide shell forms the axis of symmetry with respect to the first section as well as the second section.

The fact that the first section extends radially means, within the meaning of example aspects of the invention, an essentially radial extension of the first section, i.e., the first section of the lubricant guide shell has at least one considerably greater extension in the radial direction than is the case in the axial direction. The first section can extend, at least partially or in sections, purely in the radial direction. Alternatively or additionally, the first section can also extend, at least partially or in sections, obliquely in the radial direction as well as in the axial direction, however, wherein a radial extension of this oblique section is greater than its axial extension.

The second section extends axially, however. Within the scope of example aspects of the invention, this means an essentially axial extension of this second section. The second section therefore has a considerably greater extension in the axial direction than is the case in the radial direction. In particular, the second section can extend, at least partially or in sections, purely axially, wherein, alternatively or additionally, an extension of the second section that is oblique at least partially or in sections is also conceivable, however, in that an extension in the radial direction as well as in the axial direction is provided. In the latter case, however, there is always a greater extension in the axial direction in comparison to an extension in the radial direction.

In the installed state of the lubricant guide shell, the second section encompasses the torque converter axially at least partially and radially outwardly. Within the meaning of example aspects of the invention, this is understood to mean that, in the installed state of the lubricant guide shell, the second section extends circumferentially with respect to the torque converter and extends axially at least over a portion of the torque converter. It is particularly preferred that when the second portion has an axial extension, in the installed state of the lubricant guide shell, the second portion extends axially from the first portion and also extends axially up to an axial side of the torque converter that faces away from the first section.

A transition of the first section into the second section of the lubricant guide shell can be abruptly completed within the meaning of example aspects of the invention such that a change-over from the radial extension of the first section into the axial extension of the second section takes place in a narrow range. It is particularly preferred when a transition from the first section into the second section is implemented over a larger range, however, such that the transition from the radial extension of the first section into the axial extension of the second section takes place in an increasing manner. This transition can be configured, in particular, in dependence on a shape of the hydrodynamic torque converter in the area in which, in the installed state of the lubricant guide shell, the torque converter is encompassed by the lubricant guide shell according to example aspects of the invention. In this way, the transition can be configured, in particular, to be continuous.

According to one example embodiment of the invention, the second section, at an end facing away from the first section, is equipped with a radially outwardly projecting collar on a circumference of the second section, at least partially or in sections. The second section therefore transitions, at an end at which the transition into the first section has not been completed, into a radially outwardly projecting collar, at least partially or in sections, wherein the collar can also be designed to be completely circumferential. As a result, a radial extension can be enlarged in a targeted manner in this area of the lubricant guide shell, as the result of which, in the installed state of the lubricant guide shell, a radial gap to a surrounding housing, in particular a transmission housing, can be reduced. Consequently, as a result, a shielding of the associated hydrodynamic torque converter can be further improved.

In one refinement of the aforementioned example embodiment, the collar is equipped, radially outwardly at least partially or in sections on the circumference of the collar, with a seal, which is provided for establishing contact with a radially surrounding housing in the installed state of the lubricant guide shell. Advantageously, as a result, in the installed state of the lubricant guide shell, a seal can be formed due to the contact of the seal with the radially surrounding housing. It is particularly preferred when the collar is provided with the seal over a subsection, wherein, in the installed condition of the lubricant guide shell, the subsection forms a vertically downward situated area of the surrounding collar. The seal is injection-molded, in particular, onto the circumferential collar. Preferably, the seal is made of an elastomeric material, which can be, in particular, a rubber or silicone material.

According to one example design option of the invention, at least one breakthrough or passage is provided, via which a first side of the lubricant guide shell axially facing the torque converter in the installed state of the lubricant guide shell is connected to a second side of the lubricant guide shell axially facing away from the torque converter in the installed state of the lubricant guide shell. The breakthrough is utilized for delivering lubricant from the first side to the second side. Such a configuration of a lubricant guide shell has the advantage that, in the installed state of the lubricant guide shell, lubricant can therefore be delivered in a targeted manner from the side of the lubricant guide shell facing the torque converter to the other side. As a result, it can be ensured that lubricant can be easily diverted from the area of the hydrodynamic torque converter toward a lubricant sump of the transmission.

In one refinement of the aforementioned example design option, the at least one breakthrough is formed at least partially radially in the transition of the first section into the second section. Therefore, in the installed state of the lubricant guide shell, the at least one breakthrough is situated, on the one hand, axially in the area close to an end face of the hydrodynamic torque converter such that lubricant from this area can pass through the breakthrough of the lubricant guide shell to the other side of the lubricant guide shell. On the other hand, the at least one breakthrough is also designed to be situated radially far outside as a result. The at least one breakthrough can extend radially into the second section.

Alternatively or in addition to the aforementioned example refinement, the breakthrough is formed in the circumferential direction at a point that, in the installed state of the lubricant guide shell, is situated at the top and, as viewed in the direction of the second side, offset by zero degrees (0°) to thirty degrees (30°) with respect to a vertical axis. This area in the circumferential direction has proven to be particularly advantageous for the arrangement of a breakthrough in order to guide lubricant from the hydrodynamic torque converter side, in the installed state of the lubricant guide shell, to the other axial side of the shell.

Alternatively or additionally, furthermore, an axially projecting casing is formed on the second side, which encompasses the at least one breakthrough on the second side and defines a flow path on the second side. The flow path connects a mouth of the breakthrough on the second side with an area of the lubricant guide shell situated vertically downward in the installed state of the lubricant guide shell. As a result, a guidance of the lubricant on the second side after having flowed through via the breakthrough is achieved, as the result of which, in the installed state of the lubricant guide shell, the lubricant is reliably deflected into the vertically downward situated area and, thus, in the direction of a lubricant sump. The casing is preferably formed, at least predominantly, at the first section on the second side.

In one further example embodiment of the invention, the second section is provided radially outwardly with at least one passage. Advantageously, as a result, at least one area of the lubricant guide shell is created, via which, in the installed state of the lubricant guide shell, components can be routed past the lubricant guide shell. It is particularly preferred when a first passage and a second passage are provided. The first passage is designed for a bypass routing of a lubricant supply pipe in the installed state of the lubricant guide shell, while the second passage is utilized for a bypass routing of electrical lines in the installed state of the lubricant guide shell. The supply pipe is, in particular, a pipe, via which lubricant can be guided into the area of an electric machine for the cooling thereof. The electrical lines are also associated, in particular, with an electric machine, which is preferably arranged axially adjacent to the hydrodynamic torque converter and is connected to appropriate power terminals via the electrical lines on an opposite side of the lubricant guide shell in the installed state.

According to one example design option of the invention, axially projecting ridges are provided on a side axially facing away from the torque converter in the installed state of the lubricant guide shell, which, in the installed state, are utilized for at least partially encompassing at least one rotatable component arranged there. As a result, an excessive accumulation of lubricant can also be prevented and, thus, a foaming of the lubricant via the components can be at least reduced in this area. The rotatable component is preferably at least one spur gear of a spur gear stage, via which a drive motion is transmittable to a lubricant pump.

In one example refinement of the invention, the first section includes, at an end facing away from the second section, a through-hole, which is provided for centering the lubricant guide shell in the installed state. This through-hole is formed preferably coaxially to a central axis of the lubricant guide shell, wherein the lubricant guide shell, in its installed state, is mounted with this through-hole on a centering section, which is formed, in particular, by a section of a transmission housing. At least one shaft, for example, a shaft of the transmission, can be guided through the through-hole.

The lubricant guide shell according to example aspects of the invention is designed, in particular, as a plastic component, wherein the lubricant guide shell has preferably been manufactured via injection molding. An example embodiment as a plastic component has the advantage that a low weight of the lubricant guide shell can be achieved. In addition, the lubricant guide shell, as an insulator, can be arranged at a close distance to electrical components, such as, for example, an electric machine. In addition, as a result, small wall thicknesses can also be easily represented, wherein the plastic can also adapt to surroundings due to the property of relaxation.

According to one example design option of the invention, multiple bores are formed in the first section. At least one of the bores can be provided for fastening the lubricant guide shell according to example aspects of the invention to a component, in particular a section of a housing, via an appropriate fastener in order to implement the shielding of the adjacently situated hydrodynamic torque converter. The section can be, in particular, a centering plate of a transmission housing. The fasters can be, for example, bolts. Preferably, at least three bores are provided for accommodating fasteners. The fasteners can each be placed in appropriate sleeves in the particular bore, in particular for the case in which the lubricant guide shell is designed, in principle, as a plastic component. When the guide shell is designed as a plastic component, these sleeves can be mounted separately or even extrusion-coated with plastic.

At least one more of the bores can be provided as an open area for a bolt head that is arranged in the centering plate. Seals can be provided at mouths of at least one selection of the bores, the sealing lips of which extend radially inward into the particular bore. A sealing of the particular bore with respect to a bolt head arranged in the bore is ensured via the seals, as the result of which an undesired leakage of lubricant past the particular bolt can be limited.

The seals can each be preferably designed as rubber or silicone seals, wherein, alternatively or additionally, sealing lips of the seals can be designed to be slotted in order to facilitate the installation, in order to reduce installation forces and compensate for tolerance-related, radial and axial offsets. The seals can be part of the guide shell designed as a plastic component (two-component injection molding) or, alternatively, may have been vulcanized or injection-molded thereon. It is also conceivable to fully encase a component that is adjacent in the installed state of the lubricant guide shell.

Example aspects of the subject matter of the invention also provide a hybrid drive unit for a motor vehicle, which includes an electric machine, a hydrodynamic torque converter coupled to the electric machine, and a lubricant guide shell according to one or several of the aforementioned example variants. The lubricant guide shell is situated, with the circumferential first section, opposite an end face of the hydrodynamic torque converter and encompasses the torque converter axially at least partially and radially outwardly with the circumferential second section starting axially from the first section. As a result, a shielding of the hydrodynamic torque converter can be achieved in a reliable way such that an excessive accumulation of lubricant in the area of the hydrodynamic torque converter is prevented. Therefore, a downhill position of a motor vehicle including the module according to example aspects of the invention or even a strong deceleration of the motor vehicle do not result in a sloshing of lubricant into the area of the hydrodynamic torque converter.

In one example refinement of an aforementioned hybrid drive unit, the electric machine is arranged axially on a side of the torque converter facing away from the lubricant guide shell. If the lubricant guide shell according to example aspects of the invention is equipped at least with the first passage and the second passage, one of which is provided for the bypass routing of a lubricant supply pipe and the other of which is provided for the bypass routing of electrical lines, the lubricant supply pipe is preferably utilized for supplying lubricant to the electric machine in order to cool the electric machine. The electrical lines routed past via the passage are provided, in particular, for establishing electrically conductive connections between the electric machine and terminals.

The hybrid drive unit can be formed by a multi-stage transmission. Alternatively, the hybrid drive unit can be designed as an independent module, which is arranged between an internal combustion engine and a transmission. The transmission is, in particular, a motor vehicle transmission, wherein the hydrodynamic torque converter is preferably provided as a starting unit, which is connected upstream from a gear set of the motor vehicle transmission. The motor vehicle can be driven by the electric machine. Additionally, the electric machine, during operation as a generator, can take up a kinetic energy of the motor vehicle and supply this to an electrical energy store.

The invention is not limited to the specified combination of features of the main claim or the claims dependent thereon. In addition, individual features can be combined with one another, provided they arise from the claims, the description of a preferred embodiment of the invention which follows, or directly from the drawings. The reference in the claims to the drawings via the use of reference characters is not intended to limit the scope of protection of the claims.

BRIEF DESCRIPTION OF THE DRAWINGS

One advantageous embodiment of the invention, which is explained in the following, is represented in the drawings, wherein.

DETAILED DESCRIPTION

Figure 1:
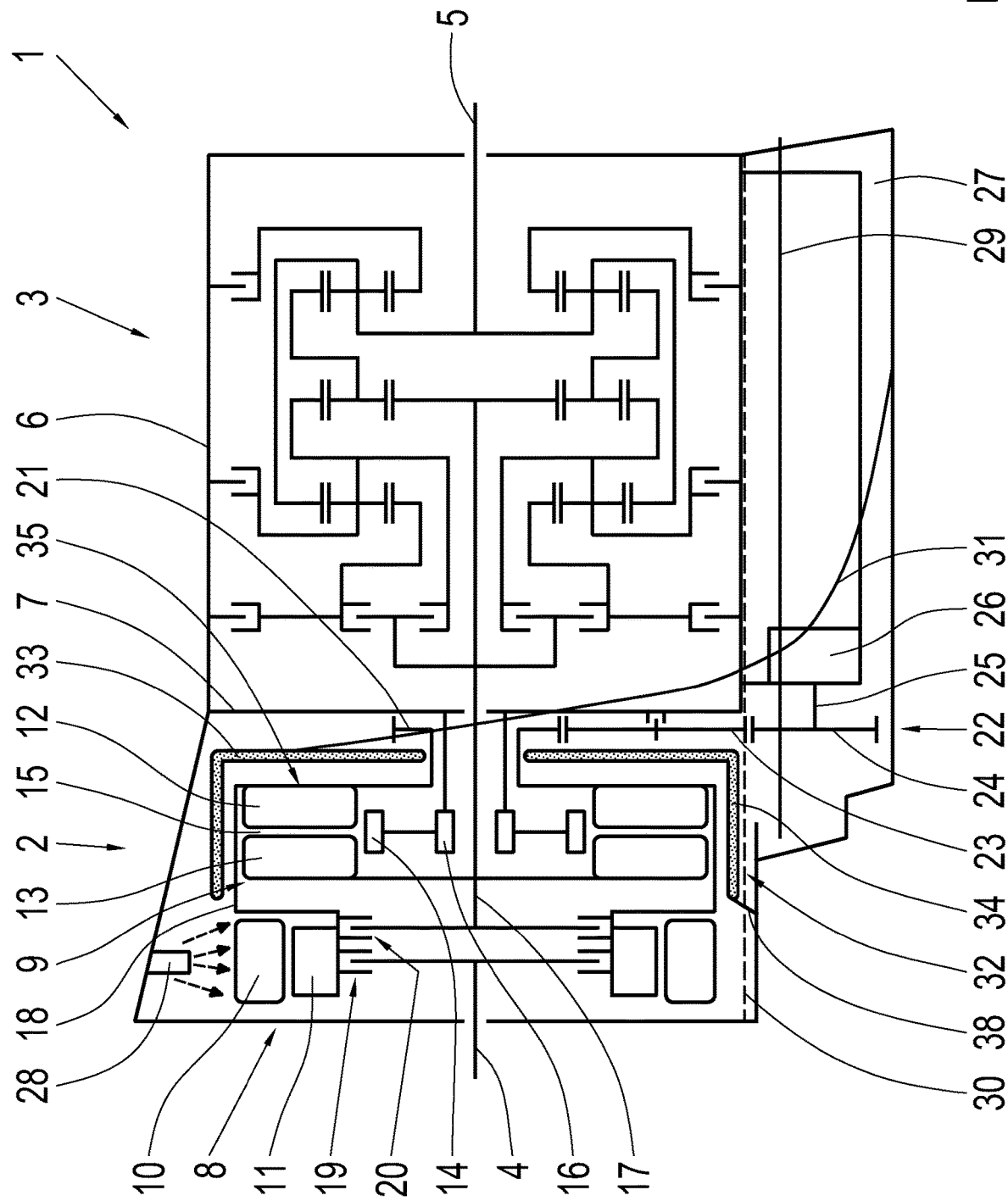
FIG. 1 shows a diagrammatic view of a transmission according to one preferred example embodiment of the invention.
Figure 2:
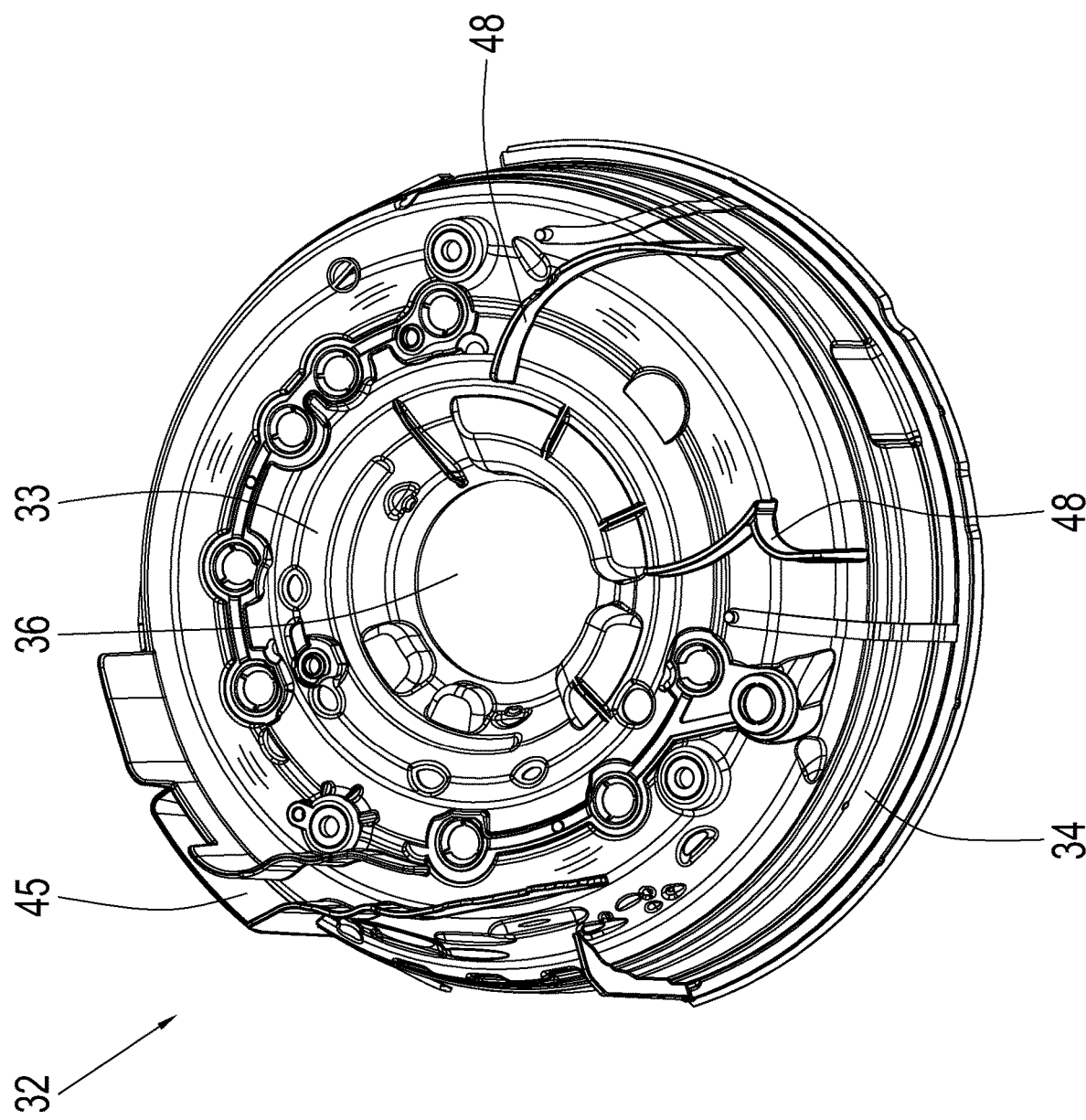
FIG. 2 shows a perspective individual representation of a lubricant guide shell of a module of the transmission from FIG. 1, according to one preferred example design option of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a diagrammatic view of a transmission 1, which is a motor vehicle transmission and is designed according to one preferred example embodiment of the invention. The transmission 1 includes a module 2 and a gear set 3, which are arranged between an input shaft 4 and an output shaft 5 and are accommodated in a housing 6 of the transmission 1. The housing 6 can be made up of multiple housing parts, wherein the module 2 is accommodated in one housing part and the downstream gear set 3 is accommodated in another housing part. Within the housing 6, the module 2 and the downstream gear set 3 are spatially separated from each other via an intermediate plate 7, which is formed by the housing 6. Alternatively, the housing 6 can be one piece such that a separate module is not necessary.

The module 2 is designed according to one preferred example design option of the invention and includes an electric machine 8 and a hydrodynamic torque converter 9, which is located within the transmission 1 axially between the electric machine 8 and the downstream gear set 3. The electric machine 8 is made up of a stator 10 and a rotor 11 and can be operated, on the one hand, as an electric motor and, on the other hand, as a generator.

The hydrodynamic torque converter 9 is made up of a turbine wheel 12, an impeller 13, and a stator 14, which are each equipped with blades and, between themselves, define a toroidal space 15 in a way known, in principle, to a person skilled in the art. The stator 14 is connected to the intermediate plate 7 via an intermediate freewheel unit 16, while the impeller 13 is permanently rotationally fixed to an input shaft 17 of the downstream gear set 3. The turbine wheel 12, furthermore, is permanently rotationally fixed to the rotor 11 of the electric machine 8 via an intermediate shaft 18, wherein the intermediate shaft 18 can be rotationally fixed to the input shaft 4 via a shift element 19 and can be brought into a rotationally fixed connection with the input shaft 17 via a shift element 20. The shift elements 19 and 20 are both present as force-locking shift elements. Since the turbine wheel 12 and the impeller 13 are also connected to each other in a rotationally fixed manner as a result of the rotationally fixed connection of the shaft 18 to the input shaft 17 upon actuation of the shift element 20, the shift element 20 functions as a torque converter lockup clutch.

The shaft 18 also carries a spur gear 21 of a spur gear stage 22 at a section extended past the turbine wheel 12 in the direction of the gear set 3, wherein the spur gear 21 is permanently meshed within the spur gear stage 22 with an intermediate gear 23, which is rotatably mounted at the intermediate plate 7. The intermediate gear 23 also still continuously intermeshes with one further spur gear 24 of the spur gear stage 22, which is arranged on a pump drive shaft 25 of a lubricant pump 26 of the transmission 1 in a rotationally fixed manner. Therefore, the lubricant pump 26 can be driven via the shaft 18 by the intermediate spur gear stage 22. The lubricant pump 26 is arranged in a lubricant sump 27 of the housing 6 and, there, plunges into lubricant located within the lubricant sump 27 in order to scavenge lubricant during a driving operation and guide the lubricant into the appropriate areas of the transmission 1 for the lubrication and/or cooling of components located there. Among other things, a feed to the toroidal space 15 of the hydrodynamic torque converter 9 and to a cooling device 28 of the electric machine 8 takes place, via which a cooling of the electric machine 8 via lubricant outflowing there can be achieved.

In FIG. 1, a minimum lubricant level and a maximum lubricant level during static travel of a motor vehicle including the transmission 1 are indicated with lines 29 and 30, respectively. As is apparent here, even in the case of the maximum lubricant level (line 30), the rotating components of the hydrodynamic torque converter 9 and of the electric machine 8 in the module 2 do not plunge into lubricant. However, due to strong decelerations of the motor vehicle, for example, due to the execution of a strong braking maneuver, lubricant can flow into the area of the module 2, as indicated, by way of example, by a line 31 in FIG. 1. This flow of lubricant into the area of the module 2 and the associated excessive accumulation of lubricant in this area could result in a foaming of the lubricant and, thus, a higher heat input, since the hydrodynamic torque converter 9, with the rotating wheels 12 and 13, and even the rotor 11 of the electric machine 8 would run in this accumulation of lubricant.

In order to prevent this, the module 2 is equipped with a lubricant guide shell 32, which is designed according to one preferred example embodiment of the invention and is represented in further individual views in the further FIGS. 2 through 5. This lubricant guide shell 32 is located in the area of an end of the module 2 facing the downstream gear set 3 and is fastened at the intermediate plate 7. The lubricant guide shell 32 includes a first section 33 and a second section 34. The first section 33 extends radially and is located axially between the hydrodynamic torque converter 9 and the intermediate plate 7, as the result of which the first section 33 is situated axially opposite an end face 35 of the hydrodynamic torque converter 9.

The second section 34 of the lubricant guide shell 32 is radially outwardly adjacent to the first section 33, wherein, starting from the first section 33, the second section 34 extends axially in the direction of the hydrodynamic torque converter 9 and radially outwardly encompasses the hydrodynamic torque converter 9. The second section 34 axially completely overlaps with the hydrodynamic torque converter 9. As is apparent in FIG. 1 and also in the further representations in FIGS. 2 through 5, the two sections 33 and 34 are circumferentially formed, i.e., the two sections 33 and 34 extend in the circumferential direction over the entire circumference. As a result, the lubricant guide shell 32 according to example aspects of the invention prevents the lubricant from sloshing into and, thus, accumulating in the area of the module 2, even in the case of an excessive inflow of lubricant into the area of the module 2, as indicated with the line 31. This is the case because the hydrodynamic torque converter 9 and, in addition, also the electric machine 8 are shielded via the two sections 33 and 34 of the lubricant guide shell 32.

As is apparent in each of the FIGS. 2 through 5, the first section 33 of the lubricant guide shell 32 is delimited radially inwardly by a through-bore 36, via which the lubricant guide shell 32, in the installed state, is centered on a section (not shown further in FIG. 1) of the intermediate plate 7. The lubricant guide shell 32 is situated with a central axis 53 (apparent, in particular, in FIG. 4) coaxially to the torque converter 9.

Figure 3:
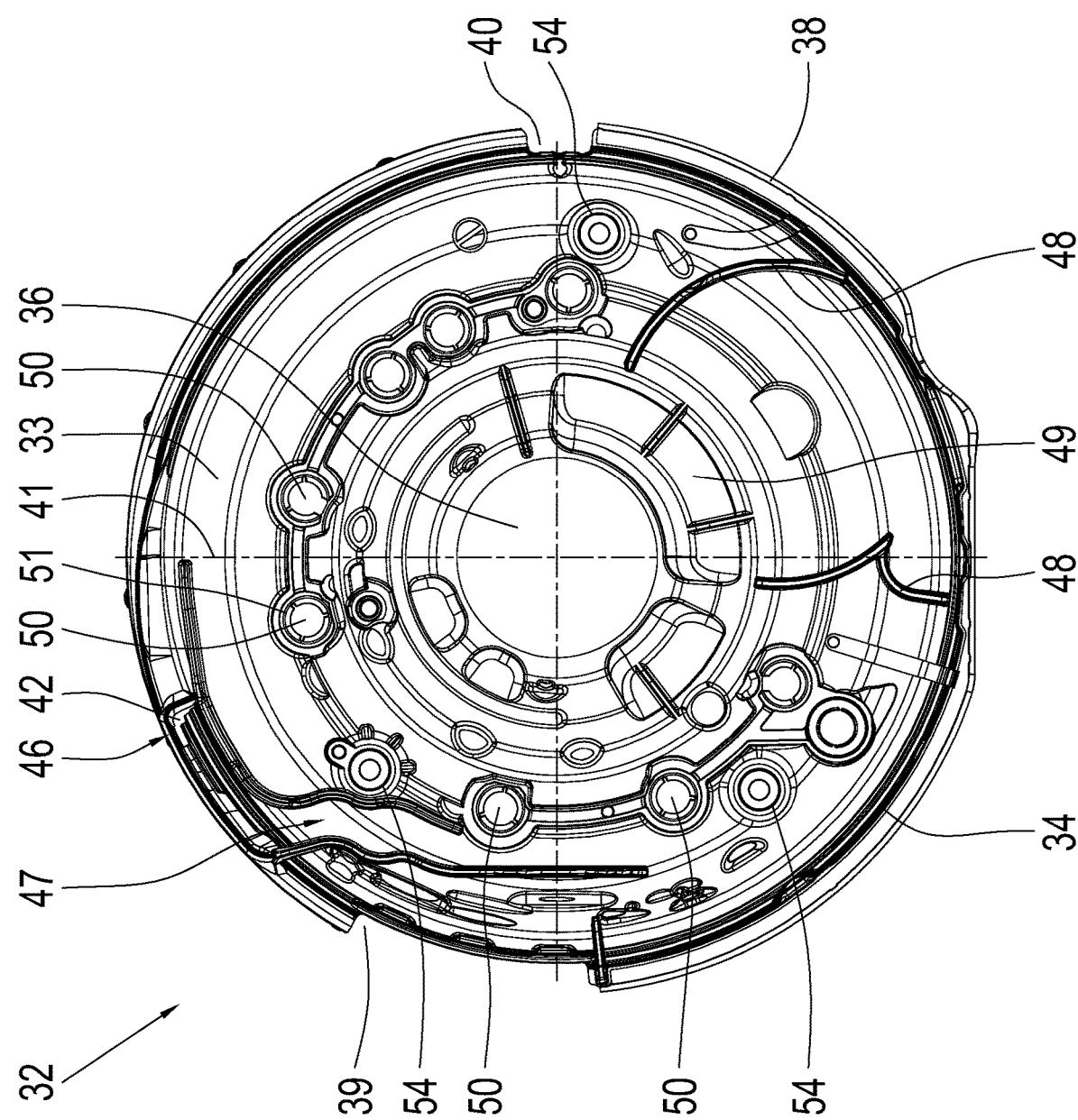
FIG. 3 shows a top view of the lubricant guide shell from FIG. 2.
Figure 4:
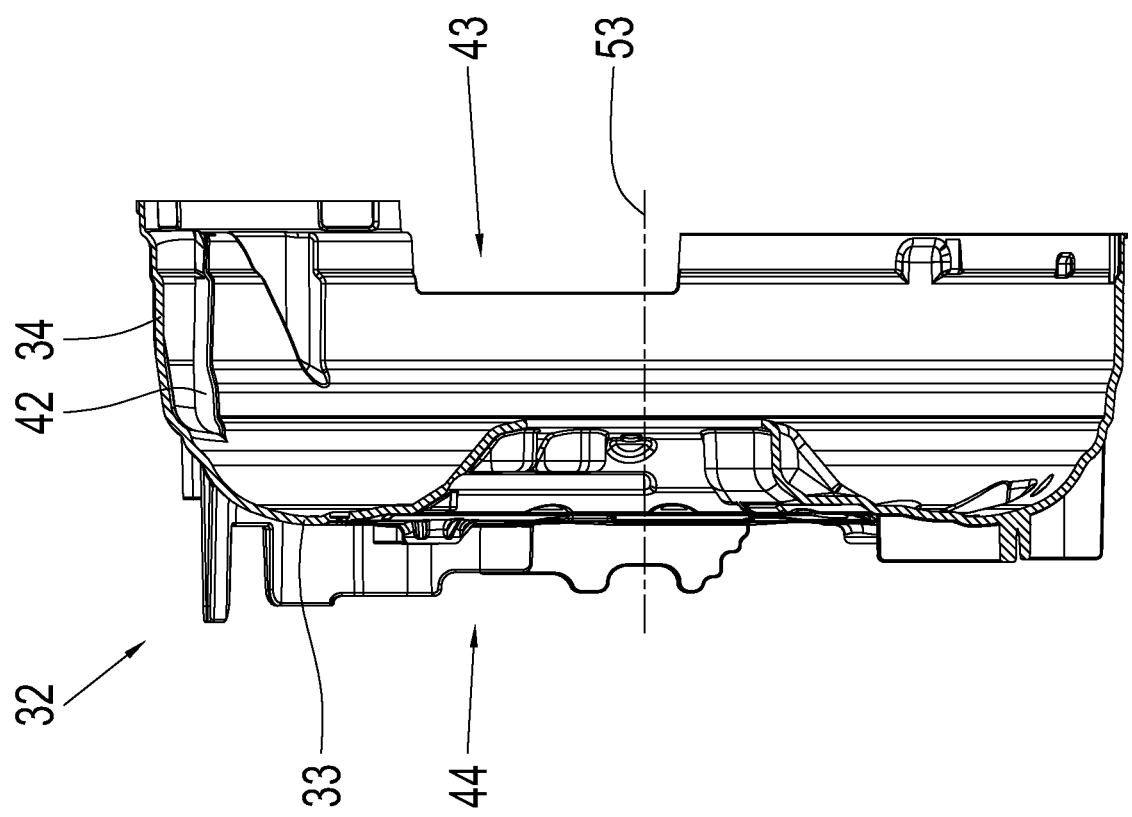
FIG. 4 shows a sectional view of the lubricant guide shell from FIGS. 2 and 3.
Figure 5:
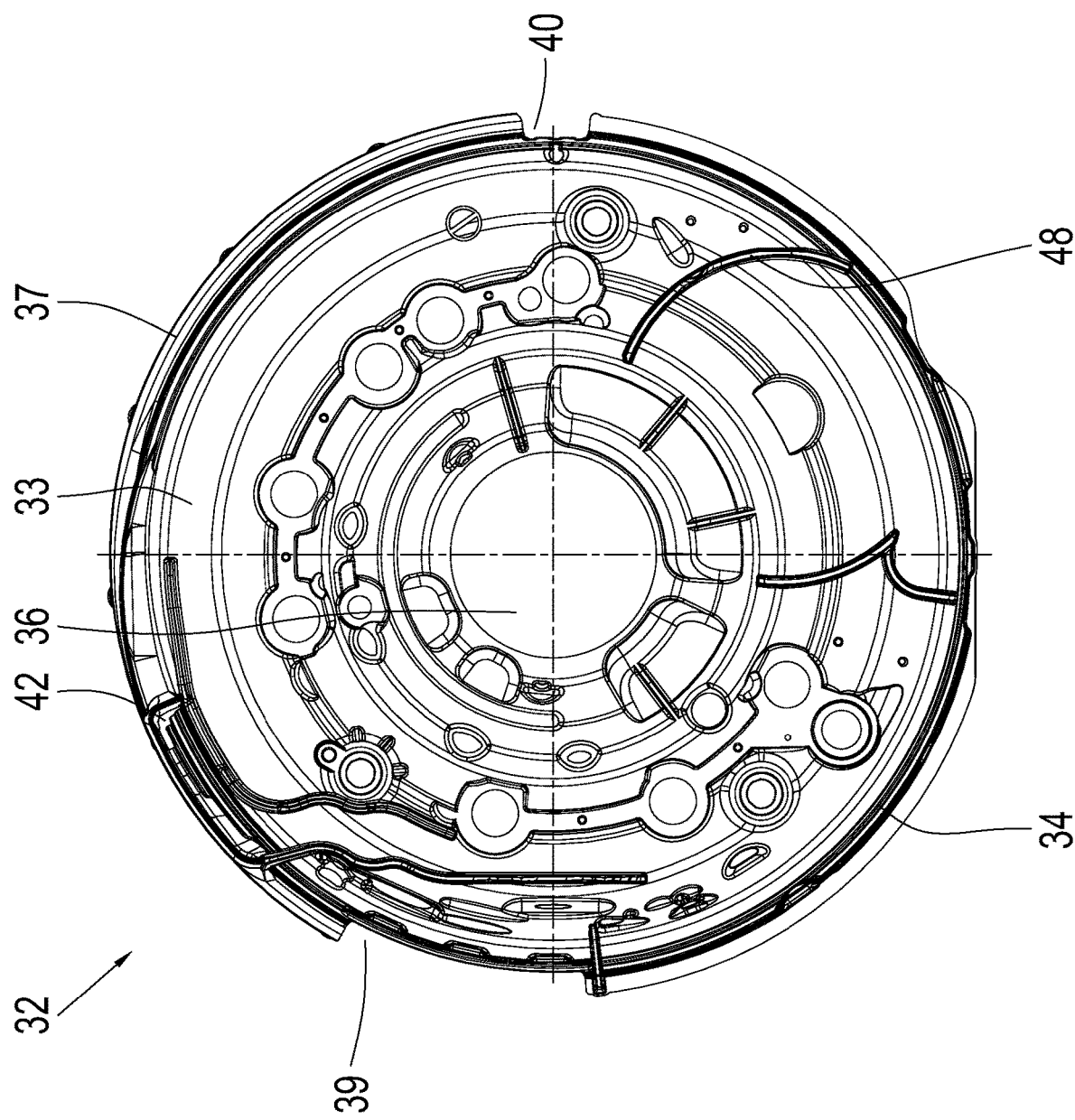
FIG. 5 shows one further top view of the lubricant guide shell from FIGS. 2 through 4, shown without seals.

Moreover, the second section 34 includes—at an end facing away from the first section 33—a collar 37, which is apparent, in particular, in FIG. 5 and is designed to be at least largely completely circumferential. A seal 38 is mounted at this collar 37 at a half that is provided to be situated vertically downward in the installed state of the lubricant guide shell 32. The seal 38 is indicated in FIG. 1 and is also represented in FIG. 3, while FIG. 5 shows the lubricant guide shell 32 without the seal 38. A contact to the surrounding housing 6 is established at this seal 38 radially outwardly and in the vertically downward situated area in order to prevent, in general, lubricant from flowing past the lubricant guide shell 32 into the area of the module 2. The seal 38 is made of a rubber or elastomeric material.

The second section 34 is interrupted radially outwardly in two areas over one portion of the outer circumference of the second section 34 in each case in order to define passages 39 and 40. While the passage 40 is formed at an angle of approximately ninety degrees (90°) with respect to a vertical axis 41 as viewed in the direction of the hydrodynamic torque converter 9, the passage 39 is situated in an angular range of approximately two hundred and seventy degrees (270°) to approximately three hundred degrees (300°) as viewed in the same direction and with respect to the vertical axis 41. The passage 39 is provided for the bypass routing of electrical lines, via which the electric machine 8 is connected to appropriate terminals located on the gear set 3 side. By comparison, the passage 40 is provided for the bypass routing of a supply pipe (not shown further in FIG. 1 in the present case), via which lubricant can be guided to the cooling device 28.

As is apparent, in particular, in each of the FIGS. 3 and 5, a breakthrough 42 is formed in a transition of the first section 33 into the second section 34, via which a first axial side 43 and a second axial side 44 are connected to each other. The two axial sides 43 and 44 are apparent in FIG. 4, wherein, in the installed state of the lubricant guide shell 32, the first axial side 43 is situated facing the hydrodynamic torque converter 9, while the second axial side 44 forms a side of the lubricant guide shell 32 facing away from the hydrodynamic torque converter 9. The breakthrough 42 functions as a scraper edge, via which a flow of lubricant from the first side 43 to the second side 44 is enabled in order to enable a return of lubricant into the axial intermediate space between the first section 33 and the intermediate plate 7 and, in addition, also into the lubricant sump 27. The breakthrough 42 is situated at an angle of approximately zero degrees (0°) to thirty degrees (30°) with respect to the vertical axis 41 in the circumferential direction as viewed in the direction of the second axial side 44 and, thus, in the direction of the intermediate plate 7.

The lubricant guide shell 32 is equipped, on the second side 44, with a casing 45, which encompasses a mouth 46 of the breakthrough 42 on the second side 44 and, starting therefrom, defines a flow path 47. Via the flow path 47, lubricant that has reached the second axial side 44 via the breakthrough 42 is directed vertically downward in order—starting from here—to be able to enter the area of the lubricant sump 27.

Likewise on the second axial side 44, axially projecting ridges 48 are formed, which partially encompass the areas in which the intermediate gear 23 is arranged and also in which the intermeshing of the intermediate gear 23 with the spur gear 24 takes place. These ridges 48 are also provided for preventing an increased accumulation of lubricant in the area of the spur gear stage 22, in that these areas are at least partially circumferentially shielded.

In the present case, the lubricant guide shell 32 is largely designed as a plastic component, in that the sections 33 and 34 have been formed in a plastic injection molding process.

The fastening of the lubricant guide shell 32 at the intermediate plate 7 is implemented in the present case via fasteners in the form of bolts (not represented further in the present case), which are located in bores 54 in the first section 33. The bores 54 are each located essentially on a diameter, wherein steel sleeves have preferably been located in the bores 54, through which the bolts are guided.

The lubricant guide shell 32 includes further bores 50, which are provided as open areas for bolt heads that are arranged in a component adjacent to the lubricant guide shell 32. In order to prevent lubricant from passing through the lubricant guide shell 32 via the bores 50, one seal 51 is provided for each bore 50, which rests against a particular bolt head of the particular bolt located therein and, thus, seals the particular bore 50. The seals 51 are each designed to be slotted in order to facilitate installation. In addition, the seals 51 are partially interrupted in areas where bulges of the first section 33 are provided.

Figure 6:
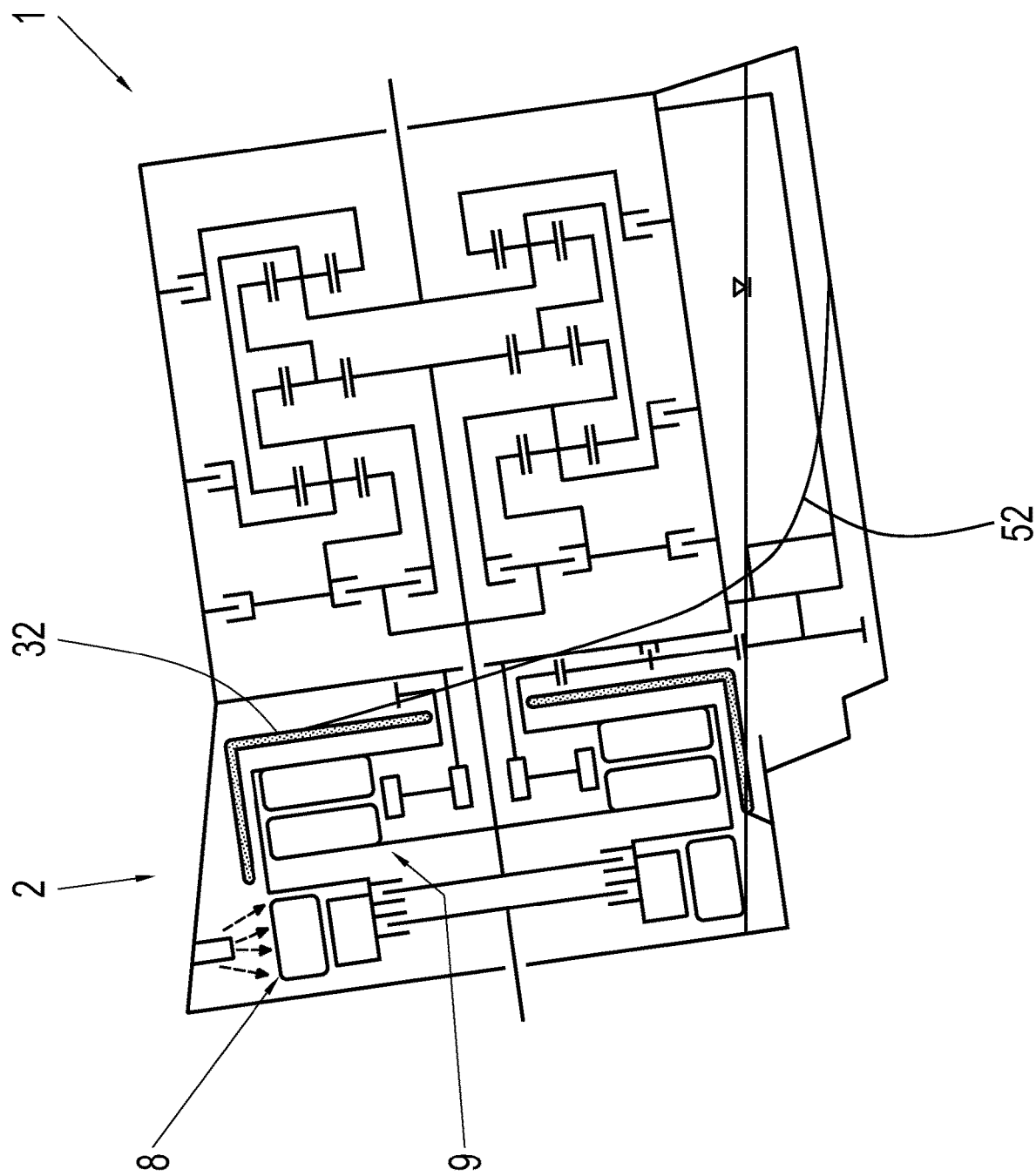
FIG. 6 shows one further diagrammatic view of the transmission from FIG. 1.

FIG. 6 shows one further representation of the transmission 1 including the module 2 and also the lubricant guide shell 32 according to example aspects of the invention. The transmission 1 is represented in a state in which a strong downhill position of the motor vehicle is present. This can also result in an excessive accumulation of lubricant in the area of the module 2, as indicated with the line 52. The lubricant guide shell 32 again shields the hydrodynamic torque converter 9 and also the electric machine 8.

Via the design of a lubricant guide shell according to example aspects of the invention, an excessive accumulation of lubricant in the area of a hydrodynamic torque converter can be prevented in a reliable way.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 transmission
2 module
3 gear set
4 input shaft
5 output shaft
6 housing
7 intermediate plate
8 electric machine
9 hydrodynamic torque converter
10 stator
11 rotor
12 turbine wheel
13 impeller
14 stator
15 toroidal space
16 freewheel unit
17 input shaft
18 shaft
19 shift element
20 shift element
21 spur gear
22 spur gear stage
23 intermediate gear
24 spur gear
25 pump drive shaft
26 lubricant pump
27 lubricant sump
28 cooling device
29 line
30 line
31 line
32 lubricant guide shell
33 first section
34 second section
35 end face
36 through-hole
37 collar
38 seal
39 passage
40 passage
41 vertical axis
42 breakthrough
43 first side
44 second side
45 casing
46 mouth
47 flow path
48 ridges
50 bores
51 seals
52 line
53 central axis
54 bore

The invention claimed is:

1. A lubricant guide shell (32) for arrangement proximate a hydrodynamic torque converter (9), the lubricant guide shell (32) comprising:
   a first, radial extending section (33) configured for placement axially opposite an end face (35) of the torque converter (9) in an installed state of the lubricant guide shell (32);
   a second, axially extending section (34), the first section (33) transitioning radially outwardly into the second section (34) such that the second section (34) axially at least partially and radially outwardly encompasses the torque converter (9) starting from the first section (33) in the installed state of the lubricant guide shell (32); and
   at least one breakthrough (42) arranged at an upper side of the lubricant guide shell (32) and through which a first side (43) of the lubricant guide shell (32) axially facing the torque converter (9) in the installed state of the lubricant guide shell (32) is connected to a second side (44) of the lubricant guide shell (32) axially facing away from the torque converter (9) in the installed state of the lubricant guide shell (32), wherein the at least one breakthrough (42) is configured for directing lubricant through the lubricant guide shell (32) from the first side (43) to the second side (44),
   wherein the first section (33) and the second section (34) are both completely circumferential, and
   wherein the lubricant guide shell (32) is discrete from a housing of the hydrodynamic torque converter (9).

2. The lubricant guide shell (32) of claim 1, wherein the second section (34) comprises, at least in sections, a radially outwardly projecting collar (37) on a circumference of the second section (34) and at an end of the second section (34) facing away from the first section (33).

3. The lubricant guide shell (32) of claim 2, wherein the collar (37) comprises a seal (38) positioned at least partially radially outward of the circumference of the second section (34), the collar (37) configured for contacting the housing (6) in the installed state of the lubricant guide shell (32).

4. The lubricant guide shell (32) of claim 1, wherein the at least one breakthrough (42) is formed at least partially radially in a transition of the first section (33) into the second section (34).

5. The lubricant guide shell (32) of claim 1, wherein the at least one breakthrough (42) is formed in a circumferential direction at a point that, in the installed state of the lubricant guide shell (32), is situated at a top and, as viewed in a direction of the second side, offset by no less than zero degrees and no greater than thirty degrees with respect to a vertical axis (41).

6. The lubricant guide shell (32) of claim 1, further comprising an axially projecting casing (45) formed on the second side (44), the axially projecting casing (45) encompassing the at least one breakthrough (42) on the second side (44) and defining a flow path (47) on the second side (44).

7. The lubricant guide shell (32) of claim 1, wherein the first section (33) comprises a through-hole (36) at an end facing away from the second section (34), the through-hole (36) configured for centering the lubricant guide shell (32) in the installed state.

8. The lubricant guide shell (32) of claim 1, wherein the first section (33) defines a plurality of bores (50).

9. The lubricant guide shell (32) of claim 8, further comprising a plurality of seals (51) provided at mouths of the bores (50), sealing lips of each seal (51) extending radially inward into a respective one of the bores (50).

10. The lubricant guide shell (32) of claim 1, wherein the lubricant guide shell (32) is a plastic lubricant guide shell (32).

11. A lubricant guide shell (32) for arrangement proximate a hydrodynamic torque converter (9), the lubricant guide shell (32) comprising:
   a first, radial extending section (33) configured for placement axially opposite an end face (35) of the torque converter (9) in an installed state of the lubricant guide shell (32);
   a second, axially extending section (34), the first section (33) transitioning radially outwardly into the second section (34) such that the second section (34) axially at least partially and radially outwardly encompasses the torque converter (9) starting from the first section (33) in the installed state of the lubricant guide shell (32); and
   a plurality of axially projecting ridges (48) positioned on a side (44) of the lubricant guide shell (32) axially facing away from the torque converter (9) in the installed state of the lubricant guide shell, the axially projecting ridges (48) configured for at least partially encompassing at least one rotatable component arranged at the side (44) of the lubricant guide shell (32) axially facing away from the torque converter (9) in the installed state of the lubricant guide shell (32),
   wherein the first section (33) and the second section (34) are both completely circumferential.

12. A lubricant guide shell (32) for arrangement proximate a hydrodynamic torque converter (9), the lubricant guide shell (32) comprising:
   a first, radial extending section (33) configured for placement axially opposite an end face (35) of the torque converter (9) in an installed state of the lubricant guide shell (32);
   a second, axially extending section (34), the first section (33) transitioning radially outwardly into the second section (34) such that the second section (34) axially at least partially and radially outwardly encompasses the torque converter (9) starting from the first section (33) in the installed state of the lubricant guide shell (32),
   wherein the first section (33) and the second section (34) are both completely circumferential, and
   wherein the first and second sections (33, 34) are a unitary plastic component.

13. A hybrid drive unit (1, 2) for a motor vehicle, comprising:
   a housing (6);
   an electric machine (8) disposed within the housing (6);
   a hydrodynamic torque converter (9) disposed within the housing (6) and coupled to the electric machine (8); and
   a lubricant guide shell (32) disposed within the housing (6) and fixed relative to the housing (6), the lubricant guide shell (32) comprising a first, radial extending section (33) and a second, axially extending section (34), wherein the first section (33) and the second section (34) are both completely circumferential,
   wherein the lubricant guide shell (32) is positioned, with the circumferential first section (33), axially opposite an end face (35) of the hydrodynamic torque converter (9) and encompassing the torque converter (9) axially at least partially and radially outwardly with the circumferential second section (34) starting axially from the first section (33).

14. The hybrid drive unit (1, 2) of claim 13, wherein the electric machine (8) is arranged in an axial direction on a side of the torque converter (9) facing away from the lubricant guide shell (32).

15. The hybrid drive unit of claim 13, wherein the hybrid drive unit is formed by a multi-stage transmission (1) or by a module (2) arranged between an internal combustion engine and a transmission (1).

\* \* \* \* \*